I. H. WRIGHT.
SPEED CHANGE GEAR.
APPLICATION FILED JUNE 25, 1917.
1,347,924.
Patented July 27, 1920.
5 SHEETS—SHEET 2.
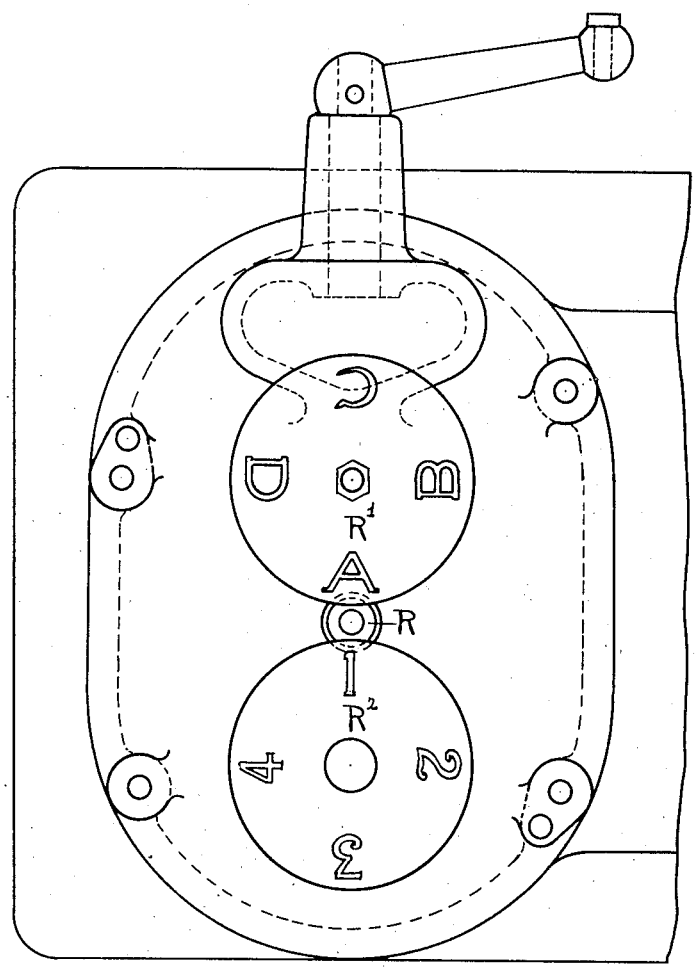
Fig. 6.
Fig. 7.
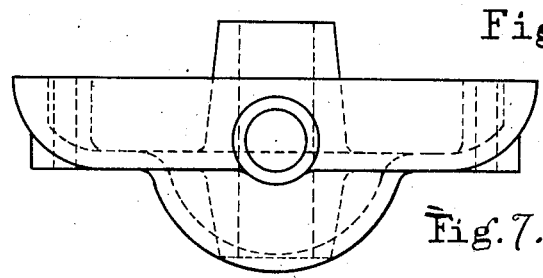

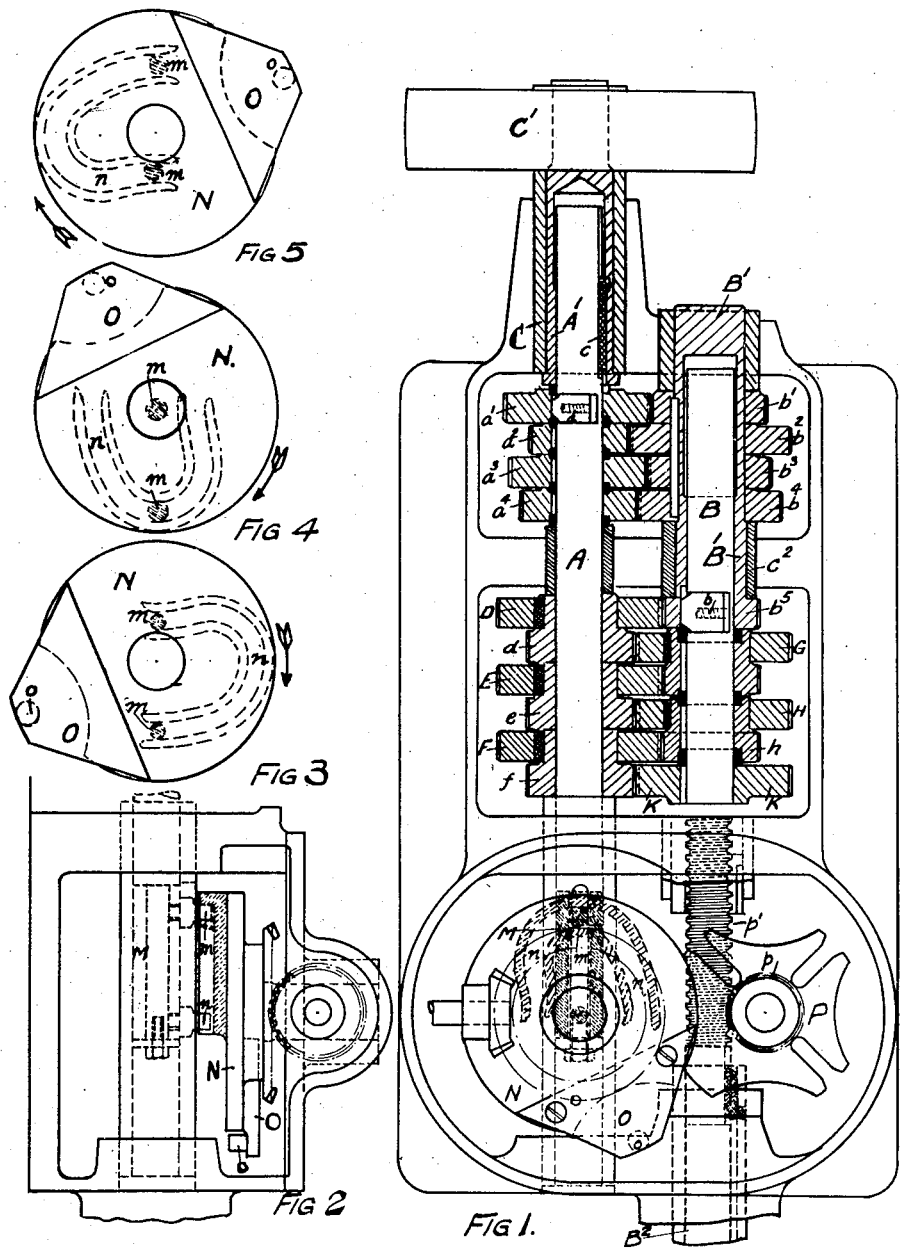

I. H. WRIGHT.
SPEED CHANGE GEAR.
APPLICATION FILED JUNE 25, 1917.

1,347,924.

Patented July 27, 1920.
5 SHEETS—SHEET 3.

Witnesses:

Inventor
Isaac H. Wright
by James L. Norris
Attorney

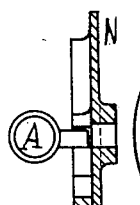
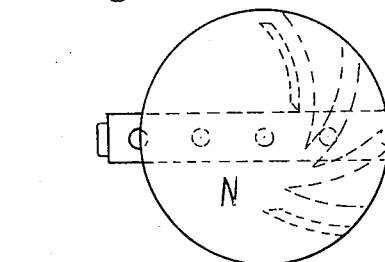
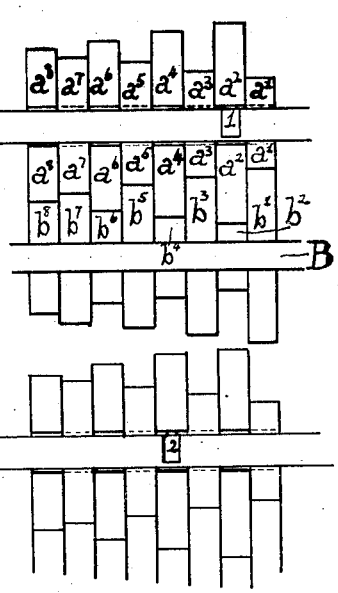
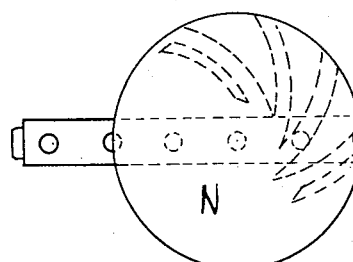
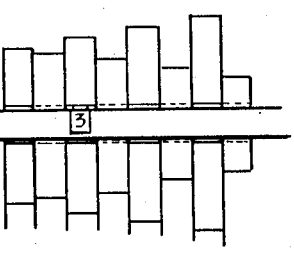
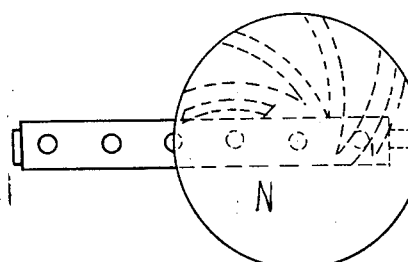

I. H. WRIGHT.
SPEED CHANGE GEAR.
APPLICATION FILED JUNE 25, 1917.

1,347,924.

Patented July 27, 1920.
5 SHEETS—SHEET 5.

Witnesses:

Inventor
Isaac H. Wright
by
Attorney

UNITED STATES PATENT OFFICE.

ISAAC H. WRIGHT, OF SALFORD, ENGLAND, ASSIGNOR TO SMITH AND COVENTRY LIMITED, OF SALFORD, ENGLAND.

SPEED-CHANGE GEAR.

1,347,924.   Specification of Letters Patent.   Patented July 27, 1920.

Application filed June 25, 1917. Serial No. 176,858.

*To all whom it may concern:*

Be it known that I, ISAAC HENRY WRIGHT, a British subject, residing at Salford, county of Lancaster, England, have invented certain new and useful Improvements in Speed-Change Gears, of which the following is a specification.

This invention relates to variable speed gears in which a selected speed is obtained from a constantly rotating shaft through wheels loose thereon by means of a key or cotter rotating with the shaft which is successively brought into engagement with the wheels by the longitudinal movement of the shaft such movement being effected by a cam.

It consists essentially in the application to the primary shaft of a sliding bearing or sleeve provided with two or more projecting pins or studs and in the particular formation of cam to engage them the groove therein being adapted by successively engaging the pins to give the required number of stations or speed variations to the gear and where a secondary change is required the application to the shaft of a second set of gear wheels which can be successively locked to the secondary shaft and a Geneva stop motion and pinion to give a longitudinal movement to the secondary shaft.

The invention will be fully described with reference to the accompanying drawings:

Figure 1 is a longitudinal sectional elevation of the improved gear in which the first position of the shifting cam is shown.

Fig. 2 is a plan of the gear operating mechanism.

Fig. 3 is a view of the shifting cam showing it in its second position.

Fig. 4 is a view of the shifting cam showing it in its third position.

Fig. 5 is a view of the shifting cam showing it in its fourth position.

Fig. 6 is a front elevation of mechanism for operating and setting the shifting cam and the Geneva stop motion.

Fig. 7 is a plan of casing of same.

Fig. 10 is a part sectional elevation of the shifting cam and sleeve bearing with six studs to give eight movements to the sleeve bearing.

Figs. 11 to 18 are diagrammatic views of the shifting cam and sleeve bearing with six studs showing them in eight successive positions.

Figure 8:
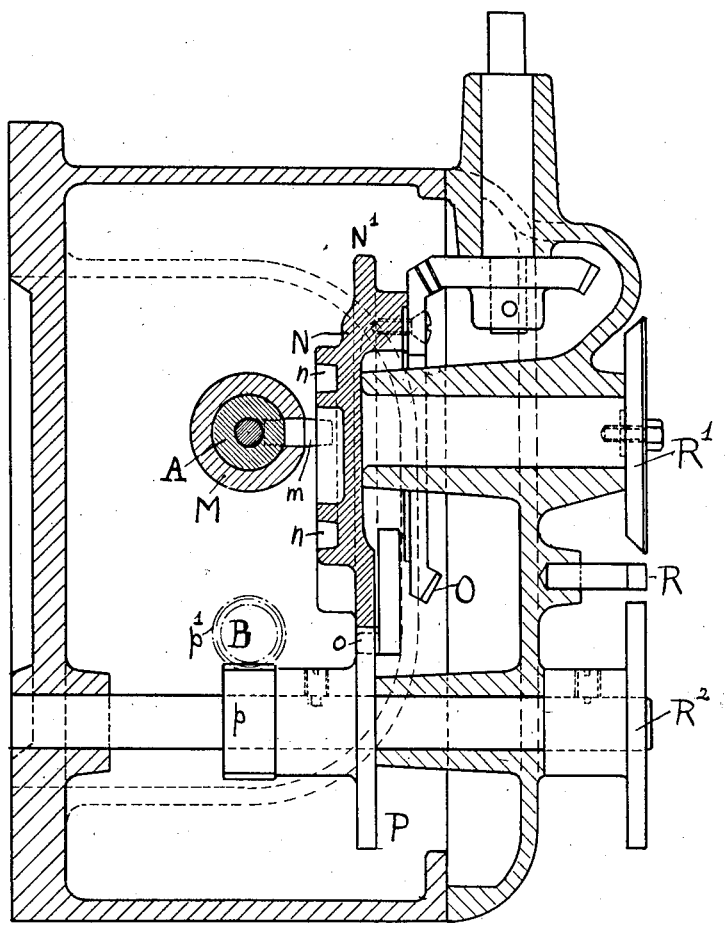
Fig. 8 is a transverse sectional elevation through the shifting cam and mechanism for operating it.

The apparatus is constructed with a primary or driving shaft A and a secondary or driven shaft B the motion being transmitted from the former to the latter. The primary shaft at one end is fitted with a driving sleeve A' mounted in a suitable bearing C, and within which it can move longitudinally over a key $c$.

The sleeve A' is fitted with a pulley C' or with a gear wheel by which it and the primary shaft A are driven.

Upon the primary shaft A any number of pinions (for example four) $a'$ $a^2$ $a^3$ $a^4$ of different diameters are loosely mounted and within a slot in the shaft A is fitted a spring key $a$ which will successively engage the pinions $a'$ $a^2$ $a^3$ $a^4$ as the shaft is moved longitudinally from one position to another.

The secondary shaft B is also at one end fitted with a sleeve B', mounted in a suitable bearing $C^2$, within which it is free to rotate and move longitudinally. Upon the sleeve B' any number of pinions $b'$ $b^2$ $b^3$ $b^4$ are mounted corresponding with the pinions $a'$ $a^2$ $a^3$ $a^4$ on the primary shaft A and with which they gear and within a slot in the shaft B a spring key $b$ is fitted to engage a slot in the sleeve B' and through which motion from the sleeve B' is transmitted to the shaft.

This constitutes the primary change gear and may be used without any secondary change gear.

For a secondary change gear a number of compound pinions D. $d$, E. $e$, F $f$, are loosely mounted upon the primary shaft A and a number of compound pinions G. $g$, H. $h$, and a pinion K are mounted loosely upon the secondary shaft B.

This train of wheels is driven from a pinion $b^5$ attached to or forming part of the sleeve B' on to the pinion D, from the pinion $d$ on to G, from $g$ on to E and so on from F on to the pinion $f$, each of the pinions G, H, K rotating more slowly than the preceding one the whole constituting a speed reducing train of wheels, any one of the pinions G, H, or K being selected to drive or rotate the secondary shaft B by sliding it longitudinally and bringing the spring key $b$ into connection directly with the sleeve B' or with one of the pinions G, H, or K.

These trains of wheels may be increased to any desired extent.

The invention relates primarily to the means for imparting a longitudinal movement to the primary shaft A, and the secondary shaft B in which are embedded the spring keys $a$ and $b$.

The primary shaft A is reduced in diameter at its operating end, the reduced part being journaled in a non-rotary sliding sleeve or bearing M which is provided with two or more projections or projecting studs or pins $m$ by which it and the shaft A with it can be moved to and fro longitudinally. A shifting disk cam N to engage and operate the studs $m$ is constructed with a groove $n$ of suitable curved shape extending approximately over about 180° of arc, the ends of the groove $n$ being spaced apart to correspond with the distance apart of the studs $m$ on the sliding bearing M or with a number of grooves $n$ $n'$ $n^2$, &c., to correspond with the number of studs $m$.

The disk cam N may be rotated by a crank on its axle or through bevel gears $n'$ or automatically by some independent governing mechanism.

In the form shown in Figs. 1 to 8 the cam N is made with a double groove $n$ of approximately horse shoe shape and as the cam rotates it controls during half a revolution one of the studs and passing this engages the other during the other half revolution. Thus the cam on completing its cycle has moved the sliding bearing a distance fully equal to the radius of the cam and where more than two pins are employed in excess of the radius of the cam. The cam groove $n$ is also so designed, in conjunction with the spacing apart of the studs or projections $m$ on the sliding bearing M that the revolution shall successively bring the key $a$ in the shaft A into engagement with the 1st., 3rd. and 4th. and then the 2nd. wheel, that is with $a'$ $a^3$ $a^4$ and $a^2$ this sequence giving two short and two medium movements which is mechanically better than three short and one long movement which latter would otherwise occur when returning to complete the cycle. The sliding movement prevents the engagement of the key $a$ until it is brought to rest opposite the wheel with which it is intended to engage.

Figure 9:
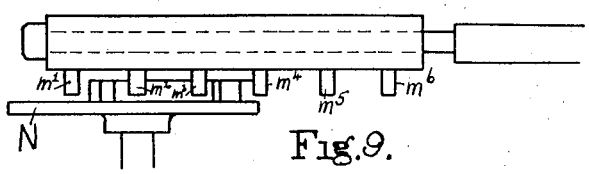
Fig. 9 is a part plan of the shifting cam and sleeve bearing with six studs.
Figure 15:
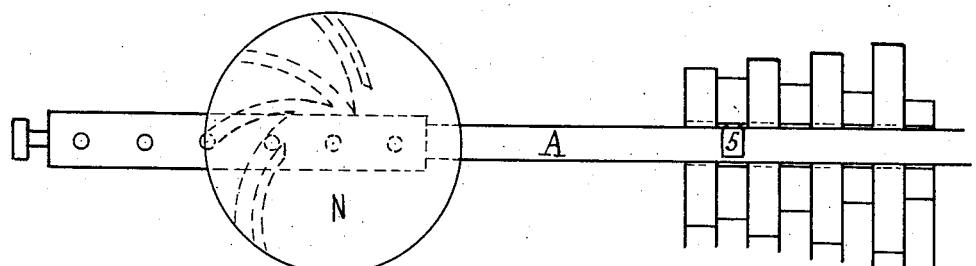
Figure 16:
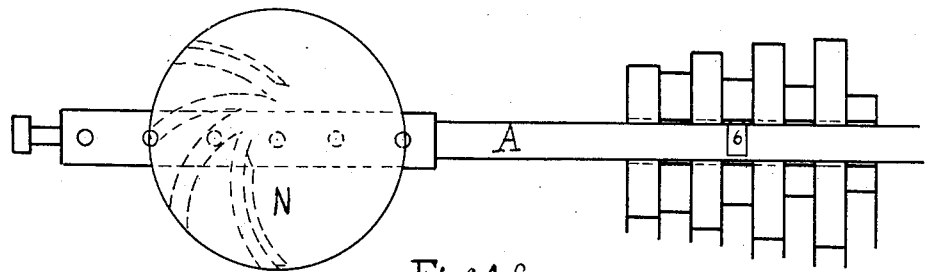
Figure 17:
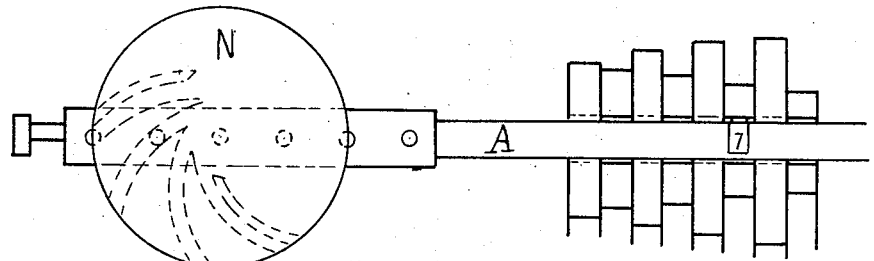
Figure 18:
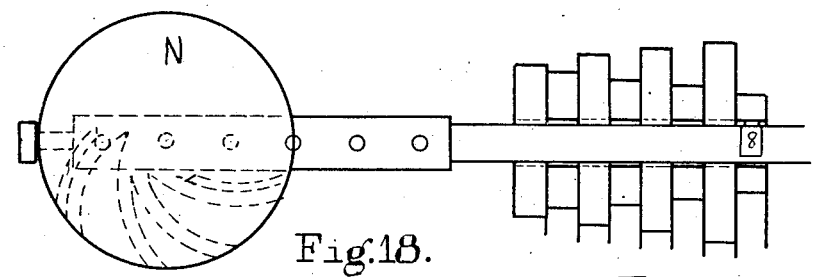

In the form shown in Figs. 9 to 18 to give a greater movement of the primary shaft A and a greater range of change wheels say eight instead of four the cam N may be made with four grooves $n'$ $n^2$ $n^3$ $n^4$ and the sliding sleeve M with six pins or studs $m'$ $m^2$ $m^3$ $m^4$ $m^5$ $m^6$ which successively engage the grooves $n'$ to $n^4$ as the cam rotates. The sizes of the pinions $a'$ to $a^8$ and the pinions $b'$ to $b^8$ and the curves of the cams $n'$ to $n^4$ are preferably so arranged that the movement of the key $a$ in the shaft A is to each alternate pinion in the forward direction and to the other alternate pinion in the opposite direction to give an equal step by step movement from the commencement of the cycle of movements to the close. The relative successive positions are shown in the Figs. 11 to 18 and indicated by the numerals 1 to 8 on the key $a$. The key $a$ readily moves past the intermediate pinion without engaging with it only engaging the desired pinion when brought to rest.

For operating the secondary change gear, at one side of the cam N a projection O is provided with a pin or stud $o$ which with the periphery of the cam N forms a part of a Geneva stop mechanism the other part or star P being secured to a pinion $p$ engaging a rack $p'$ cut in the secondary shaft B or in a sleeve bearing, in which it rotates. The Geneva stop gear is so timed that each revolution turns the pinion $p$ a sufficient distance to advance the secondary shaft B and its spring key $b$ from one gear thereon to the next.

By rotating the cam N in one direction a series of increasing speeds is obtained and transmitted to the shaft B and in the reverse direction a series of decreasing speeds.

The number of speeds can be varied with slight changes in the cam N and also in the Geneva stop as indicated in Figs. 9 to 18.

An index finger R may be affixed to the casing or cover of the cam and Geneva stop gear with disks or dials R' and R² on the spindles of the cam N and star wheel O respectively to indicate the positions of the cams and gears.

The final shaft B² whose speed is subject to the variations is connected to the secondary shaft B by a sleeve or other coupling which will permit of the longitudinal movement of the latter and may give motion to the feed train of a machine tool or to the train which drives the cutter or tool or the member carrying it, or to any other mechanism.

What I claim as my invention and desire to protect by Letters Patent is:—

1. A variable change speed gearing comprising a longitudinally shiftable drive shaft, a sleeve with which one end of the said drive shaft engages, a plurality of pinions of different diameters loosely mounted on the drive shaft, the shaft also having means to successively engage and operatively connect the pinions thereto, a longitudinally shiftable driven shaft, a sleeve on the latter shaft and having a key recess, a key device carried by the said driven shaft and adapted to be engaged with said recess of the sleeve by a shifting movement of the latter shaft, and a plurality of pinions of different diameters mounted on the sleeve of the driven shaft and corresponding to the pinions on the drive shaft with which they are adapted to gear.

2. A variable change speed gearing comprising a longitudinally shiftable drive shaft having bearing means a sliding bearing in which one extremity of the drive shaft is mounted, said bearing being provided with projecting devices, a cam disk arranged to operatively engage the projections of said bearing, a plurality of pinions of different diameters loosely mounted on the said shaft, the drive shaft having means to successively engage the pinions thereon, a slidable driven shaft, a sleeve mounted on said driven shaft and provided with means to engage the latter to transmit motion from the sleeve to the driven shaft, a plurality of pinions of different diameters mounted on the sleeve of the driven shaft and corresponding to and adapted to engage the pinions on the drive shaft, and a Geneva wheel for coöperating with the said cam disk controlling the shifting movement of the drive shaft.

3. A variable change speed gearing, comprising a longitudinally movable drive shaft, a plurality of gears of different diameters loosely mounted on said drive shaft, means on the drive shaft to successively engage and operatively connect the said gears thereto, a slidable driven shaft, a sleeve mounted on the driven shaft, gears fixed to the sleeve and meshing with the driving shaft gears, a secondary change gearing including a plurality of gears drivingly connected in series, a portion of the latter change gears being freely mounted on the driven shaft and one thereof being secured to said driven sleeve, means carried by said driven shaft to successively engage and operatively connect said last named gears thereto, and shifting means for said shafts.

In testimony whereof I have hereunto set my hand, in presence of two subscribing witnesses, this 24th day of May, 1917.

ISAAC H. WRIGHT.

Witnesses:
    I. OWDEN O'BRIEN,
    GEO. H. O'BRIEN.